United States Patent [19]
Williams et al.

[11] 3,793,906
[45] Feb. 26, 1974

[54] MAIN AND BYPASS GEAR TRAIN TRANSMISSION

[75] Inventors: Russell C. Williams, Pearce, Ariz.; Marion D. Smith, Indianapolis, Ind.

[73] Assignee: General Motors Corporation, Detroit, Mich.

[22] Filed: Oct. 10, 1972

[21] Appl. No.: 295,966

[52] U.S. Cl.................. 74/745, 74/740, 74/695, 74/681, 74/DIG. 11
[51] Int. Cl. ..... F16h 3/02, F16h 37/00, F16h 37/06
[58] Field of Search ...... 74/DIG. 11, 681, 695, 740, 74/745

[56] References Cited
UNITED STATES PATENTS

| | | | |
|---|---|---|---|
| 3,673,890 | 7/1972 | Crooks............................. | 74/740 X |
| 3,744,345 | 7/1973 | Keienburg et al. .................... | 74/745 |
| 3,455,185 | 7/1969 | Ohno et al........................ | 74/695 X |
| 3,130,605 | 4/1964 | Kennedy............................. | 74/745 |

OTHER PUBLICATIONS

"Automotive Industries," July 15, 1955, Page 66 CRT-3330 Torqmatic Transmission.

*Primary Examiner*—Benjamin W. Wyche
*Assistant Examiner*—Lance W. Chandler
*Attorney, Agent, or Firm*—A. M. Heiter

[57] ABSTRACT

A multiratio transmission having a main gear unit having multiratio gearing selectively providing a plurality of forward ratio gearing drives to a primary output shaft and driving in bypass drive relation to the ratio gearing a secondary output shaft and bypass ratio drop box gearing connecting the primary output shaft by continuously meshing primary gearing to the final drive shaft to provide the main gear unit ratio drives and selectively connecting the secondary output shaft by secondary low ratio bypass gearing to the final drive shaft to provide lowest ratio forward drive. One modification has a main gear unit having a forward and reverse planetary gear unit having a forward and reverse secondary output shaft and a multiratio gear unit connected in series selectively providing a plurality of forward and reverse ratio drives to a main gear unit primary output shaft and a drop box gear unit having continuously meshing gearing connecting the primary output shaft to a final drive shaft to provide a plurality of forward and reverse ratio drives and selectively connecting said secondary output shaft which is in bypass drive relation to said multiratio gear unit through a lower reduction ratio gearing to the final drive shaft to provide a lower forward and a lower reverse ratio drive. Another modification has a main gear unit having a pair of input clutches driving a compounded planetary gear unit selectively providing a plurality of forward and a plurality of reverse ratio drives to a primary output shaft and a secondary output shaft and drop box gearing having continuously meshing gearing connecting the primary output shaft to a final drive shaft to provide the forward and reverse ratio drives provided by the main gear unit and selectively connecting the secondary output in bypass relation with the main gearing at a lower ratio to provide a lower ratio forward drive and providing with the main gearing a lower reverse drive.

11 Claims, 3 Drawing Figures

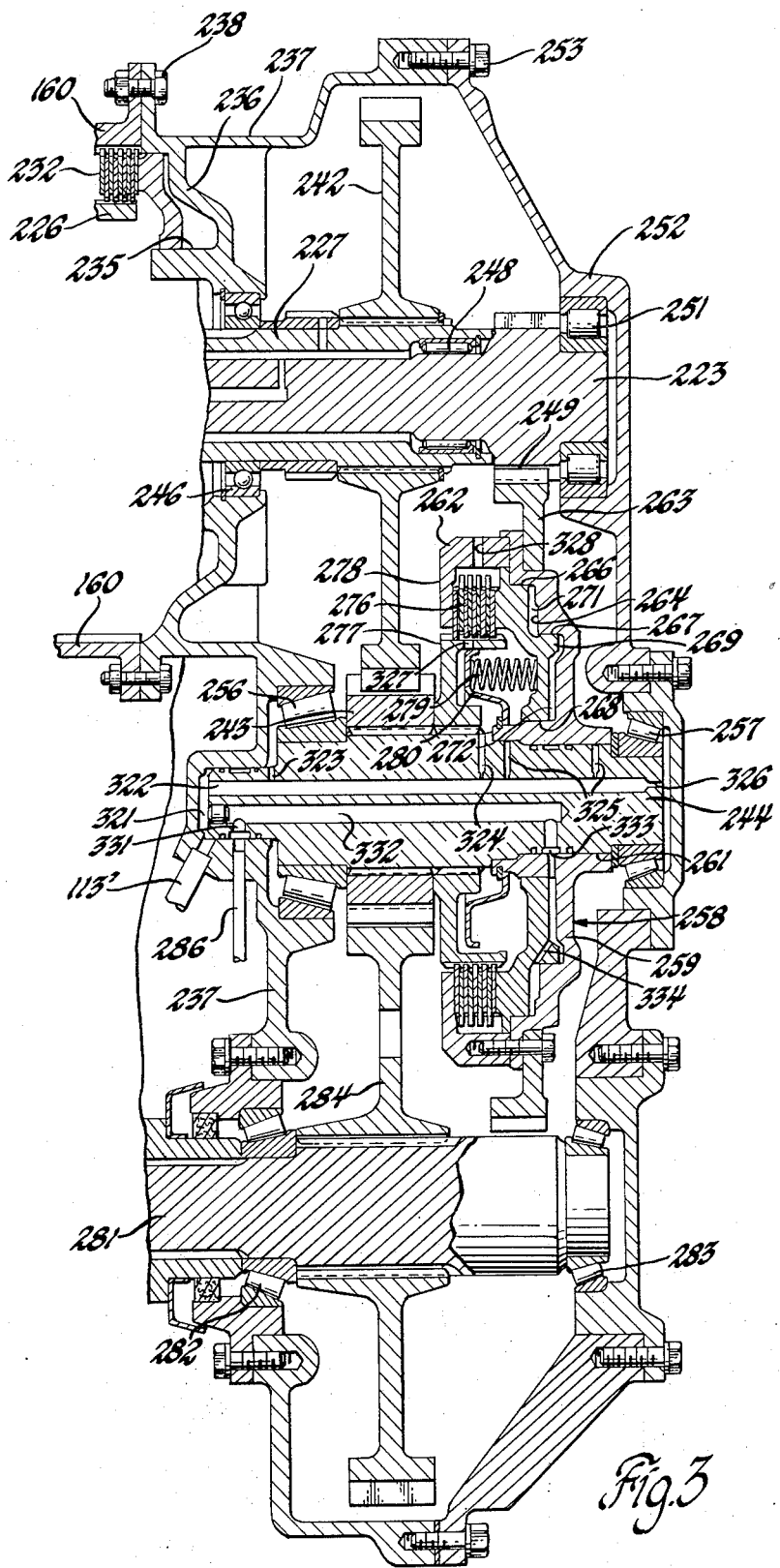

MAIN AND BYPASS GEAR TRAIN TRANSMISSION

This invention relates to transmissions and particularly transmission assemblies having a main gear unit and a bypass ratio unit.

Related patents are Howard W. Christenson U.S. Pat. No. 3,016,769 granted Jan. 16, 1962 for Transmission, Ulyses A. Breting et al. U.S. Pat. No. 3,121,342 granted Feb. 18, 1964 for Transmission and John J. O'Malley application Ser. No. 805,190 filed Mar. 7, 1969 for Power Transmission now Pat. No. 3,730,022 patented May 1, 1973.

This invention provides a transmission assembly having a main gear unit having multiratio gearing driving a primary multiratio output shaft in a plurality of ratio drives and a secondary drive output shaft arranged in bypass relation to the multiratio gearing combined with a bypass ratio gear unit having a primary gear train connecting the primary output shaft to a final output shaft to provide a plurality of ratio drives and a selectively engageable secondary drive train connecting the secondary output shaft to the final output shaft at a reduction ratio providing a low ratio drive in bypass relation to the multiratio gearing. The primary drive train is a continuously meshing drive train. It connects the primary output shaft to the final output shaft without significant speed change. The secondary drive train is selectively established to provide a low speed drive, lower than that provided by the main transmission unit and the primary gear train. The primary and secondary drive trains of the bypass gear unit are provided by two spur gear trains arranged in a drop box. The axially aligned planetary gear sets of the main gear unit drive a primary output sleeve shaft driving the continuously meshing primary gear train having a large input gear and output gear and a smaller intermediate idler gear fixed on a countershaft connecting the main gear unit to the final output shaft. The main gear unit also drives a secondary output shaft which is a quill shaft extending through the primary output shaft to the secondary gear train. This primary gear train includes an input to idler gear speed increasing drive and an idler to output gear reduction drive providing overall about a one to one drive or moderate speed increase or decrease to obtain proper final output shaft speed for the particular vehicle or load driven by the transmission assembly. The secondary gear train includes a reduction drive and the reduction drive of the primary gear train, and has a clutch to selectively establish this double reduction secondary gear train. The transmission assembly invention may employ a main gear unit having a forward and reverse reduction gear unit driving a three speed range gear unit providing three ratio drives in both forward and reverse to the primary output shaft driving the primary gear train. The secondary output shaft is driven by the forward and reverse gear unit and functions as an intermediate shaft driving the range gear unit and a secondary output bypassing the range gear unit and driving the secondary gear train having a clutch selectively engaged for establishing the lowest or first ratio drive while the range unit is in neutral. Mere disestablishing the secondary gear train clutch and establishing the range unit ratios provides all range unit ratios in either forward or reverse through the continuously meshing primary gear train. A forward reverse control valve controls the forward reverse unit and a range ratio selector control valve controls the range unit and bypass ratio unit to provide four forward and four reverse ratio drives.

The invention is preferably employed in a transmission assembly having a main gear unit using three compounded planetary gear sets for providing four forward speed ratio drives and two reverse ratio drives to a primary output sleeve shaft and a direct drive clutch driven on secondary quill output shaft functioning in the transmission main gear unit as a forward input drive to the main multispeed gear unit for forward drives and as a secondary bypass output shaft for driving the secondary gear train in bypass relation to the main gear unit. The first reverse ratio drive is a compound drive of a planetary gear set of the main transmission unit compounded with the primary and secondary gear trains of the bypass unit with the bypass clutch engaged. The first forward drive is provided by the bypass secondary output shaft and secondary gear train with the bypass clutch engaged. A forward and reverse control valve controls the main transmission unit and a ratio selector control valve controls the main unit and the bypass unit to provide five forward ratio drives and three reverse ratio drives. The other forward and reverse drives are provided in the main transmission unit and connected by the continuously meshing primary drive train to the final output.

FIG. 3 is a partial sectional view particularly showing the bypass transmission unit of the transmission assembly.

Figure 1:
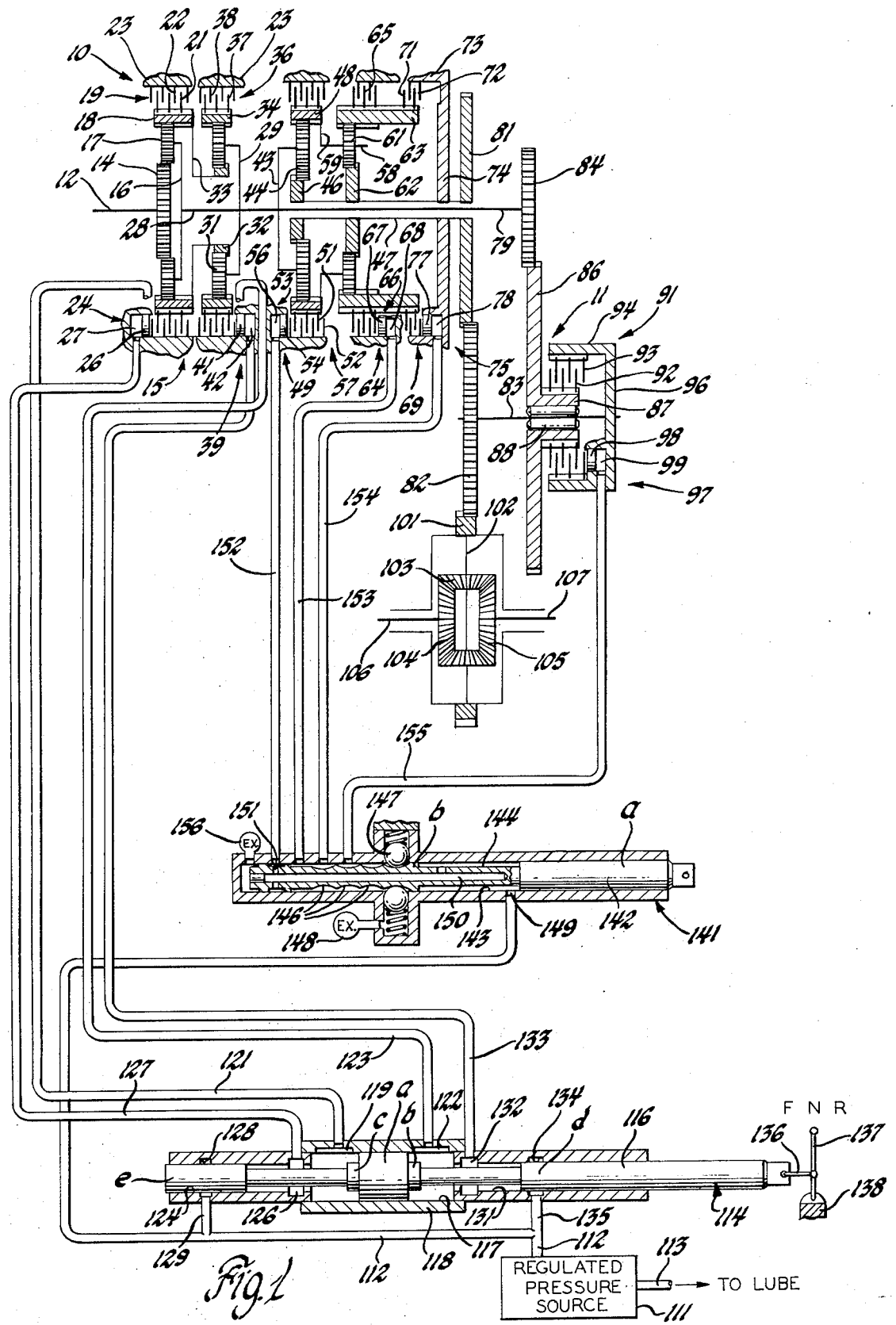
FIG. 1 is a schematic view of the transmission gearing and controls for the transmission assembly.
Figure 2:
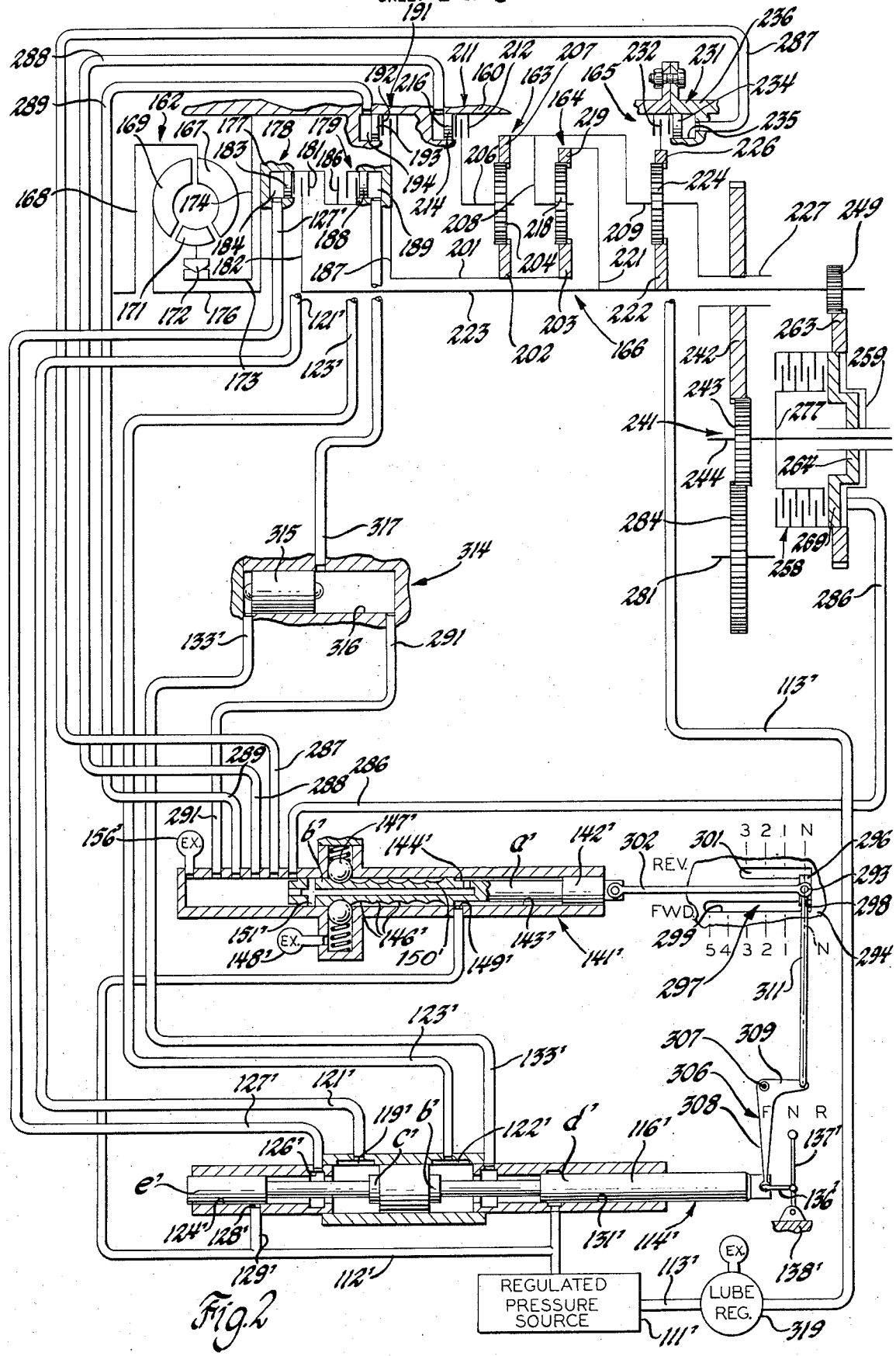
FIG. 2 is a schematic view of modified transmission gearing and controls.

The multiratio transmission drive train illustrated in FIG. 1 has a main transmission unit 10 having forward and reverse and multiratio gearing units and a bypass ratio drop box gear unit 11. The engine may drive the input shaft 12 through a conventional torque converter as shown in FIG. 2. The input shaft 12 drives the sun gear 14 of the forward and reverse planetary gear unit 15. The forward planetary gear unit includes the carrier 16 having pinions 17 rotatably mounted thereon and meshing with the sun gear 14 and a ring gear 18 which, to establish forward drive, is held stationary by the fluid operated friction device or brake 19. The brake 19 has rotary plates 21 splined to the ring gear 18 and fixed plates 22 splined to stationary housing 23 actuated by motor 24 having piston 26 reciprocable in cylinder 27 in housing 23. The carrier 16 is connected by an intermediate shaft 28 to the reverse carrier 29. The reverse planetary gear set has a plurality of pinions 31 mounted on the reverse carrier 29 which mesh with a sun gear 32 connected by the disc 33 to the ring gear 18 and mesh with a ring gear 34 connected to the fluid operated friction device or brake 36 which is engaged to establish reverse drive through the reverse gear set and the forward gear set. The brake 36 has rotary plates 37 splined to ring gear 34 and fixed plates 38 splined to housing 23 and a motor 39 having a piston 41 reciprocable in cylinder 42 in housing 23.

The intermediate shaft 28, a part of the secondary output shaft 79, provides either a forward or a reverse input to to the input member, carrier 43 of the three-speed gear set or unit 57. The carrier 43 has a plurality of planetary pinions 44 meshing with a sun gear 46 fixed to the output sleeve shaft 47 and a ring gear 48 controlled by the fourth ratio fluid operated friction device or brake 49. The brake 49 has rotary plates 51 splined to ring gear 48, fixed plates 52 splined to housing 23 and a motor 53 having piston 54 reciprocable in cylinder 56. When the brake 49 is engaged, it will be seen that the three ratio gear unit 57 operates in its third ratio or overdrive which provides the fourth ratio in this transmission. The second ratio planetary gear set of the three ratio unit 57 has a planetary carrier 58 connected by a disc 59 to the ring gear 48 and carrying a plurality of planetary pinions 61 meshing with a sun gear 62 on the output shaft 47 and a ring gear 63 controlled by the fluid operated friction device or brake 64. The brake 64 has rotary and fixed plates 65, the rotary plates splined to ring gear 63 and the fixed plates splined to housing 23 and a motor 66 having piston 67 reciprocable in cylinder 68 in housing 23. The engagement of brake 64 provides an intermediate overdrive in the three speed unit or third ratio in the transmission. The clutch 69 is engaged to connect the ring gear 63 to the output shaft 47 to provide first ratio or direct drive, the low speed drive of the three-speed gear unit and second ratio drive of the transmission. The clutch 69 has intermediate plates 71 splined to ring gear 63 and alternate plates 72 splined to drum 73 fixed by hub 74 to shaft 47 and a motor 75 having a piston 77 reciprocable in cylinder 78 in hub 74. The above brakes and clutch have conventional retraction springs, not shown.

The main transmission unit thus provides a three speed forward and reverse output to main unit ratio output shaft 47 and a reduction drive forward and reverse output from intermediate shaft 28 connected or extended by a quill portion of the forward reverse secondary output shaft 79 which extends through shaft 47 to the bypass ratio gearing.

In the drop box unit 11, the main transmission primary output sleeve shaft 47 drives the input gear 81 which meshes with and drives countershaft gear 82 fixed for rotation on countershaft 83 which is parallel and offset relative to the main transmission unit output shafts 47 and 79. The quill shaft drives gear 84 which meshes with gear 86 fixed on clutch hub 87 which is mounted by a bearing 88 for rotation on countershaft 83. The clutch 91 has intermediate plates 92 splined to the clutch hub and alternate plates 93 splined to the clutch drum 94. A hub 96 supports the drum 94 on and for rotation with countershaft 83. A motor 97 having a piston 98 reciprocable in cylinder 99 in the hub actuates the clutch. Suitable retraction springs (not shown) release the clutch. On engagement of clutch 91 a first ratio drive connects the forward reverse shaft 79 to drive gear 82 in either forward or reverse first ratio drive. To establish this first ratio drive either forward or reverse drive is established and the three speed range unit is in neutral. When the clutch 91 is disengaged selective engagement of the ratios provided by the three speed range unit will provide second, third and fourth ratio drives from primary output shaft 47 and gears 81 and 82. The gear 82 meshes with differential ring gear 101 to drive the differential carrier 102 and pinions 103 which drive the output gears 104, 105 fixed to and driving output shafts 106, 107 respectively. The transmission drives second, third and fourth (first, second and third of the range unit) in both forward and reverse to primary output shaft 47 are connected by the drop box primary gear train provided by gears 81, 82 and 101 at substantially 1:1 ratio or a proper ratio to provide the proper axle speed. The drop box bypass or secondary gear train provided by gears 84, 86 clutch 91 and gears 82 and 101 is a double reduction drive, one reduction at gear set 84, 86 and another reduction at gear set 82, 101 which in conjunction with the reduction forward and reverse drive by the forward and reverse unit 15 provides first forward or reverse drives the lowest ratios.

CONTROL SYSTEM

The transmission has a conventional sump, pump and regulator valve providing the regulated pressure source 111 supplying fluid or oil at a regulated pressure to the main line 112 and exhaust fluid to a lubrication line 113 to lubricate the transmission.

The forward and reverse gearing 15 is controlled by the forward and reverse valve 114 consisting of a valve member 116 having a large central land a and reduced diameter adjacent lands b and c and end lands d and e. The large land a is located in a large diameter bore 117 in valve body 118 having a elongated port 119 adjacent one end connected to the forward brake 19 lubricating and cooling line 121. Another elongated port 122 is located adjacent the other end of the large bore 117 and is connected to the reverse brake 36 lubricating and cooling line 123. The lands c and e of valve 116 fit in a small diameter bore 124 which has a forward port 126 located near bore 117 and connected to the forward line 127 connected to forward motor 24 and a main line port 128 located beyond port 126 and connected to the branch 129 of main line 112. The lands b and d slidably fit in the small bore 131 having the reverse port 132 located near bore 117 and connected to the reverse apply line 133 supplying the reverse motor 39 and a main line port 134 located beyond port 132 connected to branch 135 of main line 112. The valve 116 is operated by suitable linkage 136 pivotally connected to a control handle 137 pivoted by pivot 138 fixed relative to the valve body which may be moved from the neutral position N illustrated to either a forward or reverse position, indicated by F and R. In neutral, both the forward 127 and reverse 133 apply lines are connected respectively to the forward 121 and reverse 123 clutch cooling lines which provide an exhaust for a positive neutral. In the forward position, the main line 112 is connected by branch 129 and port 128 to forward apply line 127 and reverse apply line 133 is connected to reverse cooling line 123 for exhaust. In the reverse position main line 112 by branch 135 and port 134 is connected to reverse apply line 133 and forward apply line 127 is connected to forward cooling line 121 for exhaust.

The three ratio transmission unit 57 and drop box unit 11 are controlled by a four position manual selector valve 141 having a valve member 142 located in a suitable bore 143 in valve 141. The valve element 142 has land a adjacent the controlled end and central land b and groove 144 of reduced diameter. Beyond land b toward the other end, there are four annular detent grooves 146 which cooperate with detent balls 147 which are resiliently urged into the grooves to provide a four position detent. At the detent, the bore is annularly connected to exhaust 148 to exhaust leakage and to exhaust certain apply lines as described below. The main line 112 is connected to the valve bore 143 at port 149 which is always connected to groove 144. The valve 142 has a central passage 150 extending from groove 144 between lands a and b to the port 151 at the far end of the valve element. The passage 150 has suitable apertures in the reduced portion or groove 144 to receive fluid supplied by port 149 from main line 112 in all valve positions. The bore portion of passage 150 is closed at both ends, having a dead end in land a and a plug at the end adjacent port 151. The passage also has a connected annular port portion 151 having annular seal lands adjacent the end and beyond the reduced diameter portion of the detent recesses. The valve element 142 is movable by a similar handle, not shown, to move the port 151 into alignment or registry with the port for the fourth apply line 152 to actuate the high brake 49 for fourth drive to the port for the third apply line 153 to actuate the intermediate brake 64 for third drive to the port for the second apply line 154 to actuate the low clutch 69 for second drive and to the port for the first apply line 155 to actuate the bypass clutch 91 for first drive.

In each valve position, the apply lines on the side of port 151 adjacent the detent are connected to exhaust 148 and the apply lines on the opposite side of port 151 to exhaust 156 are connected to exhaust 156 so one apply line is supplied and the others exhausted in each valve position. The above regulated fluid pressure supply 111 and the use of exhaust for converter and lubrication feed 113, the forward and reverse valve 114 and selector valve 141 are like the controls shown in Howard W. Christenson U.S. Pat. No. 3,016,764, granted Jan. 16, 1962.

The drop box gearing provides first drive and the three ratios in the main transmission range unit provide second, third and fourth ratio drives. These controls thus provide four drives in forward and reverse when pressure is supplied under the control of the forward and reverse valve 116 and selector valve 141 to engage the friction device, clutches and brakes, as indicated by X in the following chart and the others are exhausted.

| Ratio device reference No. | Brakes | | | | | Clutches | |
|---|---|---|---|---|---|---|---|
| | Fwd. 19 | Rev. 36 | 4th 49 | 3d 64 | 2d 69 | 1st 91 | |
| Fwd.: | | | | | | | |
| 1 | X | | | | | | X |
| 2 | X | | | | | X | |
| 3 | X | | | X | | | |
| 4 | X | | X | | | | |
| Rev.: | | | | | | | |
| 1 | | X | | | | | X |
| 2 | | X | | | | X | |
| 3 | | X | | X | | | |
| 4 | | X | X | | | | |

Referring to FIG. 2 of the drawing, there is shown a transmission having a housing 160 which encloses a torque converter 162 and three planetary gear sets 163, 164 and 165 of the main transmission planetary gear unit 166 which provide forward and reverse gearing and range ratio gearing. The torque converter 162 has an impeller 167 driven by an engine through input housing 168, a turbine 169 and a stator 171 in fluid communication with the impeller and turbine and connected to the transmission housing 160 via a one-way brake 172, a sleeve shaft 173 and a stationary wall 174.

The torque converter 162 is of conventional construction and transmits power from the engine to the transmission gearing. The turbine 169 is splined to a transmission input shaft 176 which is splined to, and drives, clutch housing 177. The clutch housing is drivingly connected to two input clutches 178 and 179.

The input or forward clutch 178 includes a plurality of clutch plates 181, alternately spaced plates are splined to the clutch housing 177 and intermediate plates splined to a hub 182. A piston 183 is slidably mounted in a cylinder formed in the clutch housing 177 and cooperates therewith to provide a fluid chamber 184 which, when pressurized, urges the piston 183 to engage the clutch plates 181 thereby applying the clutch 178. A return spring, not shown, moves piston 183 out of engagement when the chamber is not pressurized.

The input clutch or fourth and reverse clutch 179 includes a plurality of spaced plates 186, the drive plates are internally splined to the clutch housing 177 and driven plates externally splined to a drum part of member 187. A piston 188 is slidably mounted in a cylinder formed in the member 187 and cooperates therewith to provide a fluid chamber 189 which is adapted to be pressurized as a motor to engage the clutch 179. A return spring, not shown, functions to move the piston out of engagement when the chamber is not pressurized. A brake 191 is also operatively connected with the drum member 187 and includes plates 192. Alternate spaced plates are splined to the drum or member 187 and intermediate plates are splined to transmission housing 160. A piston 193 is slidably mounted in a cylinder 194 fixed on the housing and cooperates therewith to provide a fluid chamber which is adapted to be filled with pressure fluid to engage the brake 191. A plurality of return springs, not shown, are provided to maintain the piston out of engagement with the plates when the brake is disengaged.

The sleeve shaft 201 is splined to drum 187 and to a pair of sun gears 202 and 203 which are components of planetary gear sets 163 and 164 respectively. The planetary gear set 163 also includes a plurality of planet pinions 204 which are rotatably mounted on a carrier 206 and meshing with the sun gear 202 and a ring gear 207. The ring gear is drivingly connected to a carrier 208 of the planetary gear set 164 and a carrier 209 which is a member of the planetary gear set 165. The carrier 206 is operatively connected to the brake 211 which includes the plurality of spaced plates 212, alternate plates are splined to the carrier 206 and intermediate plates to the housing 160. A piston 214 is slidably mounted in cylinder 216 and cooperates therewith to provide a fluid chamber which is adapted to be filled with pressure fluid to engage the brake 211. A plurality of return springs, not shown, are provided to move the piston 214 out of engagement with the brake plates to disengage the brake 211 when the chamber is not pressurized.

The planetary set 164 also includes a plurality of pinion gears 218 which are rotatably mounted on the carrier 208 and which mesh with sun gear 203 and a ring gear 219. Ring gear 219 is drivingly connected through a hub 221 with shaft 223 to a sun gear 222 of the planetary set 165. The ring gear 219 and the sun gear 222 are splined to the intermediate shaft 223, a quill shaft extending through sleeve shaft 201 and connected by hub 182 to the input clutch 178. The intermediate shaft is called a secondary output shaft since it not only provides the input to the multiratio gearing but is also employed as a secondary output of the main transmission unit bypassing the multiratio gearing thereof and driving the bypass drop box unit 241.

The planetary set 165 also includes a plurality of pinion gears 224 which are rotatably mounted on the carrier 209 and mesh with the sun gear 222 and a ring gear 226. The carrier 209, the carrier 208 and the ring gear 207 are drivingly connected to the main transmission primary sleeve output shaft 227. The ring gear 226 is operatively connected to a brake 231 which includes a plurality of spaced plates 232. The alternate plates are splined to the transmission housing 160 and intermediate plates to the ring gear 226. A piston 234 is slidably disposed in a cylinder 235 in the rear wall 236 of the transmission housing provided by the front portion 237 of the drop box housing annularly secured and sealed by screws 238 to barrel housing 160. The piston and cylinder cooperate to provide an apply chamber which is adapted to be filled with pressure fluid to move the piston 234 into engagement with the plates thereby applying the brake 231. A plurality of return springs, not shown, are provided to move the piston out of engagement with the brake plates when the chamber is not pressurized. For further details of this main transmission unit 166 reference is made to the John J. O'Malley patent No. 3,730,022, patented May 1, 1973.

The above described main transmission unit 166 drives the bypass ratio drop box gear unit 241, FIGS. 2 and 3. In the drop box unit the main transmission primary output shaft 227 is spline drive connected to input spur gear 242 which drives intermediate spur gear 243 which is fixed for rotation by splines with the parallel axial offset countershaft 244. The primary output shaft 227 is rotatably supported by bearing 246 in the rear wall 236 for main transmission housing 160 and by bearing 248 on the secondary output shaft 223 inboard of bypass input spur gear 249 on this shaft. The secondary output shaft 223 is rotatably supported by bearing 251 fixed in the rear drop box housing portion 252 which is secured by screws 253 to the front drop box housing portion 237. The counter shaft 244 is rotatably supported by bearings 256 and 257 in the front and rear drop box housing portions 237 and 252. The bypass ratio clutch 258 has a hub 259 rotatably mounted by a plain bearing 261 on countershaft 244. Hub 259 has a drum portion 262 and a gear 263 fixed thereon. Gear 263 meshes with gear 249. The hub has a stepped cylinder 264 having outer 266, intermediate 267 and inner 268 annular walls and receiving a similarly stepped piston 269 providing outer 271 and inner 272 chambers. The piston is splined to the drum for rotation with the drum and reciprocation. The clutch plates 276 are alternately splined to the drum 262 and a hub 277 splined to shaft 244. The plates are engaged by the piston on one side and by the backing plate 278 on the other side. The backing plate is fixed to drum 262. Retracting springs 279 compressed between the piston and a retainer plate 280 fixed to hub 259 return the piston to disengage the clutch.

The output shaft 281 is mounted by bearings 282 and 283 mounted respectively in the front and rear drop box housing portions and has fixed thereon output gear 284 meshing with intermediate spur gear 243.

When the bypass clutch 258 is engaged a double reduction bypass gear train drive, one reduction by gears 249 and 263 and another reduction by gears 243 and 284 is provided for first ratio drive the lowest ratio drive from the secondary output shaft 223 to the final output shaft 281. When the bypass clutch is disengaged the primary output shaft 227 drives through and increasing ratio spur gear set 242 and 243 and a reducing ratio gear set 243 and 284 to provide about a one to one drive in the drop box so the normal main transmission ratios are provided to the final output shaft 281.

The clutches and brakes described above are actuated by fluid pressure supplied by a similar regulated pressure source 111' supplying main line 112'. The forward reverse valve 114', FIG. 2, is like the above described forward reverse valve 114 of FIG. 1 so primed reference numerals have been used and reference is made to the above description.

The manual selector valve 141' is a six position valve but otherwise is like the above described four position manual selector valve 141 so like reference numerals primed have been used for the similar valve parts and reference is made to the above description of selector valve 141. The six positions of selector valve 141' are neutral N and first through fifth ratio position 1 to 5. Thus there are six detent grooves 146' and groove 144' has a length equal to the length of movement through six detent positions plus the port width so it is always connected to main line 112'. Because selector valve 141' is interlocked with forward reverse valve 114', the valve 141' is shown in the neutral position where port 151' is blocked and all apply lines, first apply line 286, second apply line 287, third apply line 288, fourth apply line 289 and fifth apply line 291 are connected to exhaust 156'. On manual forward selector movement from neutral through 1st to 5th positions forward the first to fifth apply lines are selectively respectively in registry with port 151' and supplied with main line pressure. In each valve position the apply lines on the detent side of port 151' are connected to exhaust 148' and those on the other side to exhaust 156'. The linkage as explained below limits movement in reverse to reverse first to third positions respectively supplying the first to third apply lines.

The selector valve 141' is actuated by a handle lever 293, like lever handle 136', pivoted below the guide plate 294 by a universal pivot 296 fixedly supported relative to the valve body below the guide plate, extending through guide slot 297 in the guide plate and having a handle portion above the guide plate. The lever is pivoted below guide plate 294 a sufficient distance so the movement is in a small arc and thus relatively straight. The guide plate slot 297 has a transverse neutral slot portion 298, a five position forward slot 299 extending from one end of the neutral slot and a three position reverse slot 301 extending from the opposite end of the neutral slot. A rod 302 is pivoted to the valve element 142' and lever 293 for positioning the valve element in accordance with handle lever position. An interlock linkage interconnects the forward reverse valve element 116' and the handle lever 293 to transversely position the handle lever in the neutral slot portion in response to movement of the forward reverse valve.

A bell crank lever 306 is pivotally mounted at its central apex portion by a pivot 307 fixed relative to the valve bodies, has a long arm portion 308 pivotally connected to valve element 116' and a short arm portion 309 pivotally connected to one end of rod 311. The other end of rod 311 is pivotally connected to handle lever 293. The bell crank lever arms are proportioned so that forward reverse valve movement neutral to forward or neutral to reverse moves the selector valve handle lever 293 from the neutral position shown in the center of neutral slot 298 respectively to one end of the neutral slot in alignment with the forward slot 299 and to the opposite end of the neutral slot in alignment with the reverse slot 301. The transmission is controlled by first moving the forward and reverse valve 114' from neutral to the forward or reverse position desired, which positions the selector valve lever 293 in the proper slot for selecting forward or reverse ratio drives. To return to neutral the selector valve lever 293 is first returned to neutral and then forward and reverse valve lever 137' is returned to neutral.

The forward reverse valve 114' in forward position connects main line to forward apply line 127' which is directly connected to chamber 184 to act on piston 183 to apply the forward clutch 178 and positions selector lever 293 in forward slot 299 to condition the transmission for five forward speeds under the control of the selector lever 293 operating in the forward slot. The forward reverse valve 114' in reverse position connects main line to reverse apply line 133'. The reverse apply line 133' and the fifth apply line 291 are connected to opposite ends of shuttle valve 314 which has a valve element 315 reciprocable in bore 316. The reverse and fifth apply line 317 is connected from the center of bore 316 directly to chamber 189 to act on piston 188 to apply reverse and fifth clutch 179. Thus in reverse position of the forward and reverse valve the reverse and fifth clutch 179 is connected for supply and exhaust control by the forward reverse valve.

The selector valve 141' in the forward and reverse first second and third positions connects main line pressure respectively to first apply line 286, second apply line 287 and third apply line 288 which are respectively directly connected to apply bypass clutch 258 for first ratio, second transmission brake 231 (first in the four speed unit), and third transmission brake 211 (second in the four speed unit) to engage first, second or third drives in either forward or reverse. In forward fourth position the selector valve supplies main line pressure to fourth apply line 289 directly connected to fourth transmission brake 191, third in the four speed unit, to engage fourth forward drive. The selector valve in forward fifth position connects main line to fifth apply line 291 which is connected by the shuttle valve 314 to reverse fifth apply line 317 to engage reverse fifth transmission clutch 179, fourth in the four speed unit, for fifth forward drive.

This control operation of FIG. 2 is shown in the following chart where X indicates the clutches and brakes supplied with pressure fluid for engagement to provide each drive and that the other clutches and brakes are exhausted and disengaged.

|  | Clutch | | Brake | | | Clutch |
| --- | --- | --- | --- | --- | --- | --- |
|  | Forward 178 | Rev.-5th 179 | 4th 191 | 3d 211 | 2d 231 | 1st. bypass 258 |
| Fwd.: | | | | | | |
| 1 | X | | | | | X |
| 2 | X | | | | X | |
| 3 | X | | | X | | |
| 4 | X | | X | | | |
| 5 | X | X | | | | |
| Rev.: | | | | | | |
| Lo. 1 | | X | | | | X |
| Int. 2 | | X | | | X | |
| Hi. 3 | | X | | X | | |

The lubrication line 113', FIG. 2, regulated by the lubrication pressure regulator valve 319 with excess fluid connected to exhaust is connected to lubricate the main transmission and the drop box 11 at chamber 321, FIG. 3, feeding axial passage 322 in countershaft 244. The passage 322 has a restricted branch 323 for bearing 256, largest restricted branch 324 for clutch cooling and gear lubrication, branches 325 for bearing 261 and branch 326 for bearing 257. The clutch plate cooling and lubrication supplied by branch 324 flows through apertures 327 and 328 in the inner and outer clutch drums and is thrown to lubricate the gearing. The suction return to the fluid source 111' is a little above the bottom of the drop box housing so there is splash lubrication of the gearing and output shaft bearings.

First apply line 286 is connected by transfer seal 331 to blind axial passage 332 in countershaft 244 by transfer seal 333 and through hub 259 to inner chamber 272 and through restriction 334 to outer chamber 271 to apply bypass clutch 258.

Forward clutch 178, when engaged, provides a drive connection from the torque converter 162 through intermediate or secondary output shaft 223 to ring gear 219, sun gear 222 and secondary output gear 249. Reverse-fifth clutch, 179, when engaged, provides a drive connection from the torque converter 162 through sleeve shaft 201 to sun gears 202 and 203. Fourth brake 191, when engaged restrains sleeve shaft 201 and sun gears 202 and 203 from rotation to establish sun gear 203 as the effective reaction member. Third brake 211 restrains carrier 206 from rotation to establish the carrier as a reaction member. Second brake 231 restrains the ring gear 226 from rotation to establish the ring gear as a reaction member. In all forward drives, forward clutch 178 remains engaged. One additional clutch or brake as explained below is selectively engaged and the others released for each ratio drive. To provide first gear drive forward, the clutch 178 drives secondary quill output shaft 223 and bypass clutch 258 is engaged to establish the double reduction spur gear drive to final output shaft 281. The feed back at a reduced speed in the same direction of rotation by reduction gear sets 249, 263 and 243, 242 drives or idles primary shaft 227 and through gear set 164 overdrives shaft 201. The idling speed is low in this low speed first gear drive. To provide forward second drive second brake 231 is engaged providing a simple planetary reduction in the planetary gear set 165 to primary output shaft 227 which is connected in second and all higher forward ratio drives by the continuously meshing output gearing 242, 243, 284 to final drive shaft 281.

To establish third gear forward, third brake 211 is engaged to provide a compound reduction drive in planetary gear sets 163 and 164 between the input shaft 176 and the primary output shaft 227 which, as in second, drives final output shaft 281. In third gear forward, the ring gear 219 is the input member for the planetary gearing and ring gear 207 and carrier 208 are output members. The planetary set 165 idles and carries no load.

To establish fourth gear forward, fourth brake 191 is engaged providing a simple planetary reduction in planetary gear set 164 between the input shaft 223 and the primary output shaft 227 to drive final output shaft 281. The ring gear 219 is also the input member in fourth gear forward and the carrier 208 is the output member.

To establish fifth gear forward, clutch 179 is engaged. With both clutches 178 and 179 engaged, the planetary sets 163, 164 and 165 are in a lockup or one to one condition providing a direct drive from the input shaft 223 to the primary output shaft 227 to drive final output shaft 281.

To establish first, second and third reverse ratio, clutch 179 is engaged driving sun gears 202 and 203 and one additional clutch or brake is selectively engaged and the others disengaged. First or lowest reverse drive is provided by also engaging the bypass clutch 258 connecting ring gear 219 through double reduction of gear sets 249, 263 and 243, 242 to carrier 208 for compound drive by planetary gear set 164 driven by sun gear 203. To establish the second reverse drive, second brake 231 is engaged to provide a compound reverse reduction ratio in planetary gear sets 164 and 165 between input shaft 176 and primary output shaft 227. In second reverse drive, the sun gear 203 is the input member and the carriers 208 and 209 are the output members of the planetary gear set driving primary output shaft 227 which through continuously meshing about 1:1 ratio gears 242, 243 and 284 drives final output shaft 281.

To establish a third reverse ratio, the third brake 211 is engaged. This establishes a simple planetary reverse reduction drive in planetary gear set 163 between the input shaft 223 and the output shaft 227 which as in second reverse drives final output shaft 281. In this drive, the sun gear 202 is the input member and the ring gear 207 is the output member of the planetary gear set.

During first forward drive, the high torque is transmitted by heavy duty drop box reduction gear sets 249, 263 and 243, 284 bypassing all gearing in the main transmission unit. During second forward ratio, the rear gear set 165 transmits all of the engine torque at second ratio to output shaft 227 and by drop box gears 242, 243 and 284 to final output shaft 281. Therefore, gear set 165 and gear 242 are designed for lower second drive torque capacity. During third ratio forward, due to ring gear 219 input and torque sharing by the planetary gear sets 163 and 164, these gear sets are designed for lighter torque loads. During fourth ratio, the torque is transmitted by the gear set 164, however, the torque ratio is small during these drives to permit the use of a low capacity gear set.

Since in this type of planetary transmission the forward and reverse ratios are interrelated by gear size selection for all ratios, a proper selection is made for proper substantially equal low step ratio forward drives particularly suitable for manual or automatic power shifting resulting in first reverse being a low creeper drive and second third reverse drives having a normal shift step. Thus all three ratios may be used with proper manual control and second third reverse with manual or automatic control.

It should be understood that further modifications will occur to those skilled in the art.

It is claimed:

1. In a transmission; a main planetary transmission unit having an input shaft, a primary output shaft, a secondary output shaft, a multiratio gear unit connected to be driven by said input shaft and connected to drive said primary and secondary output shafts and having a plurality of gear unit drive establishing devices selectively operable for establishing a plurality of ratio drives to said primary output shaft and a drive to said secondary output shaft; bypass gearing having a final output member, a primary gear train connecting said primary output shaft to said final output member and a secondary gear train connecting said secondary output shaft in bypass relation to a portion of said primary gear train and a bypass drive establishing device for establishing a drive from said secondary output shaft to said final output member for the lowest ratio drive, drive controls for selectively engaging said gear unit drive establishing devices for providing said drive to said secondary output shaft and for establishing said bypass drive establishing device for one ratio drive and selectively engaging said gear unit drive establishing devices and disestablishing said bypass drive establishing device to provide a plurality of ratio drives to said primary output shaft to drive said primary gear train and final output member in a plurality of ratio drives.

2. The invention defined in claim 1 and said primary gear train being a continuously driving gear train.

3. The invention defined in claim 2 and said multiratio gear unit providing a plurality of forward ratio drives and a reverse ratio drive to said primary output shaft, said primary gear train and output member.

4. The invention defined in claim 2 and said multiratio gear unit providing a plurality of forward ratio drives and a plurality of reverse ratio drives to said primary output shaft, said primary gear train and said output member.

5. The invention defined in claim 4 and said multiratio gear unit providing a forward drive and a reverse drive to said secondary output shaft, said secondary gear train and output member for providing a first forward ratio drive and a first reverse drive.

6. The invention defined in claim 4 and said multiratio gear unit providing a plurality of forward and a plurality of reverse ratio drives to said primary output shaft, primary gear train and final output member, a forward drive to said secondary output shaft which on engagement of the bypass drive establishing device provides a lowest forward drive to said final output member and on engagement of a drive establishing device in said multiratio unit conditioning it for reverse drive and engagement of said bypass drive establishing device a portion of said multiratio gear unit is compounded by the interconnected primary and secondary drive trains to provide a first lowest reverse ratio drive to the final output member.

7. In a transmission; a main planetary transmission unit having an input shaft, a primary sleeve output shaft element, a secondary quill output shaft element coaxially located within and extending beyond said primary output shaft element at both ends, a multiratio forward and reverse planetary gear unit having a plurality of axially aligned planetary gear sets having interconnected and meshing gear elements connected to be driven by said input shaft and connected to drive said primary output shaft element and said secondary output shaft element having a forward, a reverse and a plurality of ratio drive friction torque establishing devices for establishing on engagement of said forward device and each of said plurality of ratio devices a plurality of forward ratio drives to said primary output shaft element, on engagement of said reverse device and each of said plurality of ratio devices a plurality of reverse ratio drives to said primary output shaft element, on engagement of said forward device providing a forward drive to said secondary output shaft element and on engagement of said reverse device providing a drive to one of said elements; bypass drop box gearing having a final output member parallel and offset relative to said output shaft elements, primary continuously meshing and driving spur gear train having a ratio increasing gear set driven by said primary output shaft element and driving a ratio decreasing gear set connected to drive said final output member to provide a ratio drive from said primary output shaft element to said final output member and a secondary continuously meshing spur gear train connecting said secondary output shaft element in bypass relation to said ratio increasing gear set and having a reduction gear set driven by said secondary drive shaft element and driving said ratio decreasing gear set and final output member and a bypass clutch establishing a double reduction drive from said secondary output shaft element to said final output member for the lowest ratio drive, control means including drive direction control means for selectively engaging said forward and reverse friction torque establishing devices and ratio control means for selectively engaging said ratio friction torque establishing devices and said bypass clutch for engaging said forward device and said bypass clutch for establishing first ratio forward drive, for engaging said reverse device and said bypass clutch for establishing first ratio reverse drive, said forward ratio device and selectively each of said plurality of ratio devices for establishing each of a plurality of higher forward ratio drives and said reverse ratio drives and selectively each of said plurality of ratio devices for establishing each of a plurality higher reverse ratio drives.

8. The invention defined in claim 7 and said planetary gear unit having a range ratio gear unit controlled by said plurality of ratio drive friction torque establishing devices and driving said primary output shaft element, a forward and reverse gear unit controlled by said forward and reverse drive friction torque establishing devices and driven by said input shaft and driving said range ratio gear unit and said secondary output shaft element in both forward and reverse drive.

9. The invention defined in claim 7 and said planetary gear unit having a plurality of compounded planetary gear sets having said gear elements and said control means on engaging said reverse device and bypass clutch establishing a compound reverse drive to one gear element of a planetary gear set compounded by interconnection of the primary and secondary output shaft elements by said primary and second drive trains.

10. In a transmission; a main planetary transmission unit having an input shaft, a primary sleeve output shaft, a secondary quill output shaft coaxially located within and extending beyond said primary output shaft at both ends, a forward and reverse reduction planetary gear unit connected to be driven by said input shaft and connected to drive said secondary output shaft and having a forward brake for establishing forward reduction drive and a reverse brake for establishing reverse reduction drive and a three speed planetary range gear unit connected with and driven by said secondary shaft and driving said primary output shaft and having low, intermediate and high ratio friction drive establishing devices selectively operable for establishing therein low, intermediate and high ratio drives; drop box gearing having a final output member parallel and offset relative to said output shafts, a primary gear train having a ratio increasing gear set driven by said primary output shaft and driving a ratio decreasing gear set connected to drive said final output member shaft to provide about 1:1 ratio drive from said primary output shaft to said final output member and a secondary gear train connecting said secondary output shaft in bypass relation to said range gear unit and ratio increasing gear set and having a reduction gear set and a bypass clutch establishing a reduction drive from said secondary output shaft to said ratio decreasing gear set and final output member for the lowest ratio drive, drive direction controls for selectively engaging said forward and reverse brake for providing forward or reverse drive and ratio controls for establishing said bypass clutch for first ratio drive, said low ratio device for second drive, said intermediate ratio device for third drive and said high ratio device for fourth drive in either forward or reverse.

11. In a transmission; a main planetary transmission unit having an input shaft, a primary sleeve output shaft, a secondary quill output shaft coaxially located within and extending beyond said primary output shaft at both ends, a forward and reverse multiratio planetary gear unit connected to be driven by said input shaft and connected to drive said primary output shaft and said secondary output shaft and having a forward clutch for conditioning the gear unit for forward drive and a reverse clutch for conditioning the gear unit for reverse drive and having low, intermediate and high ratio friction drive establishing devices selectively operable with said forward clutch for establishing therein low, intermediate and high ratio forward drives to said primary output shaft, said low and intermediate drive establishing devices selectively operable with said reverse clutch for establishing low and intermediate reverse drives to said primary output shaft, and said forward clutch being engageable to drive said secondary output shaft; drop box gearing having a final output member parallel and offset relative to said output shafts, a primary gear train having a ratio increasing gear set driven by said primary output shaft and driving a ratio decreasing gear set connected to drive said final output member to provide about 1:1 ratio drive from said primary output shaft to said final output member and a secondary gear train connecting said secondary output shaft in bypass relation to said gear unit and ratio increasing gear set and having a reduction gear set and a bypass clutch establishing a reduction drive from said secondary output shaft to said ratio decreasing gear set and final output member for the lowest ratio drive, drive direction controls for selectively engaging said forward and reverse clutch for conditioning the multi ratio gear unit for forward or reverse drive and ratio controls for establishing said bypass clutch for first ratio forward or reverse drive, said low ratio device for second ratio forward or reverse drive, said intermediate ratio device for third ratio forward or reverse drive and said high ratio device for fourth ratio forward drive.

* * * * *

PO-1050
(5/69)

UNITED STATES PATENT OFFICE
CERTIFICATE OF CORRECTION

Patent No. 3,793,906      Dated February 26, 1974

Inventor(s) Russell C. Williams, Marion D. Smith, James C. Polak

It is certified that error appears in the above-identified patent and that said Letters Patent are hereby corrected as shown below:

In the title: James C. Polak's name was omitted as one of the inventors.

In the specification: Column 5, line 28, "Pat. No. 3,016,764" should be -- Pat. No. 3,016,769 --;

In the claims: Column 13, claim 9, line 52, "second" should be -- secondary --.

Signed and sealed this 15th day of October 1974.

(SEAL)
Attest:

McCOY M. GIBSON JR.
Attesting Officer

C. MARSHALL DANN
Commissioner of Patents